United States Patent [19]
Johann

[11] Patent Number: 5,292,185
[45] Date of Patent: Mar. 8, 1994

[54] ARRANGEMENT OF ELECTRONIC PARTS FOR AN ANTI-LOCK BRAKING SYSTEM FOR A VEHICLE

[75] Inventor: Hiebl Johann, Waldmünchen, Fed. Rep. of Germany

[73] Assignee: Siemens Aktiengesellschaft, Munich, Fed. Rep. of Germany

[21] Appl. No.: 955,861

[22] PCT Filed: Aug. 19, 1991

[86] PCT No.: PCT/DE91/00656
§ 371 Date: Dec. 10, 1992
§ 102(e) Date: Dec. 10, 1992

[87] PCT Pub. No.: WO92/03316
PCT Pub. Date: Mar. 5, 1992

[30] Foreign Application Priority Data

Aug. 27, 1990 [DE] Fed. Rep. of Germany ....... 9012296

[51] Int. Cl.$^5$ .................. B60T 8/58; B61C 15/08
[52] U.S. Cl. .................. 303/100; 188/181 R; 303/103; 303/91; 180/169
[58] Field of Search ........ 303/100, 102, 103, 104–111, 303/93, 91; 180/197, 169, 170; 364/426.03, 426.01, 426.02; 188/181 R, 181 A; 356/5

[56] References Cited

U.S. PATENT DOCUMENTS 3,466,097 9/1969 Flook, Jr. .
3,918,058 11/1975 Noyori et al. .................. 303/100 X
3,960,410 6/1976 Leitz et al. .
4,606,586 8/1986 Eckert et al. .
4,767,164 8/1988 Yeung .................. 303/91
4,965,729 10/1990 Häfner .

5,176,431 1/1993 Strehle .................. 303/103

FOREIGN PATENT DOCUMENTS 0294803 12/1988 European Pat. Off. .
3226074 9/1983 Fed. Rep. of Germany .
2250098 5/1975 France .

OTHER PUBLICATIONS

"Doppler radar skid control device enhances auto safety" by Y. Kaneko et al., Journal of Electronic Engineering, No. 133, Jan. 1978, pp. 54–57.

Primary Examiner—Douglas C. Butler
Attorney, Agent, or Firm—Hill, Steadman & Simpson

[57] ABSTRACT

Arrangement of electronic parts for an anti-lock braking system of a vehicle, for example of a motor vehicle, having electronic wheel sensors, which monitor the rotation behavior of the vehicle wheels and/or of the vehicle axles during braking, and having a control unit, controlled electrically by the wheel sensor, that acts differently on the wheels in the event of locking, depending on their locking state. At least one ground clearance sensor is also fitted close to or on the vehicle floor, and its directional characteristic is aligned toward the ground, that is toward the road surface. At least one memory unit is provided, which at least briefly stores each of the signals received from the ground clearance sensor, and/or signals derived therefrom. An evaluation unit is provided which, by use of the memory unit, tests the signal received from the ground clearance sensor, at least when the wheels are locked, to determine whether the amplitude and/or frequency or frequencies of this signal indicate that the vehicle is stationary or skidding.

6 Claims, 1 Drawing Sheet

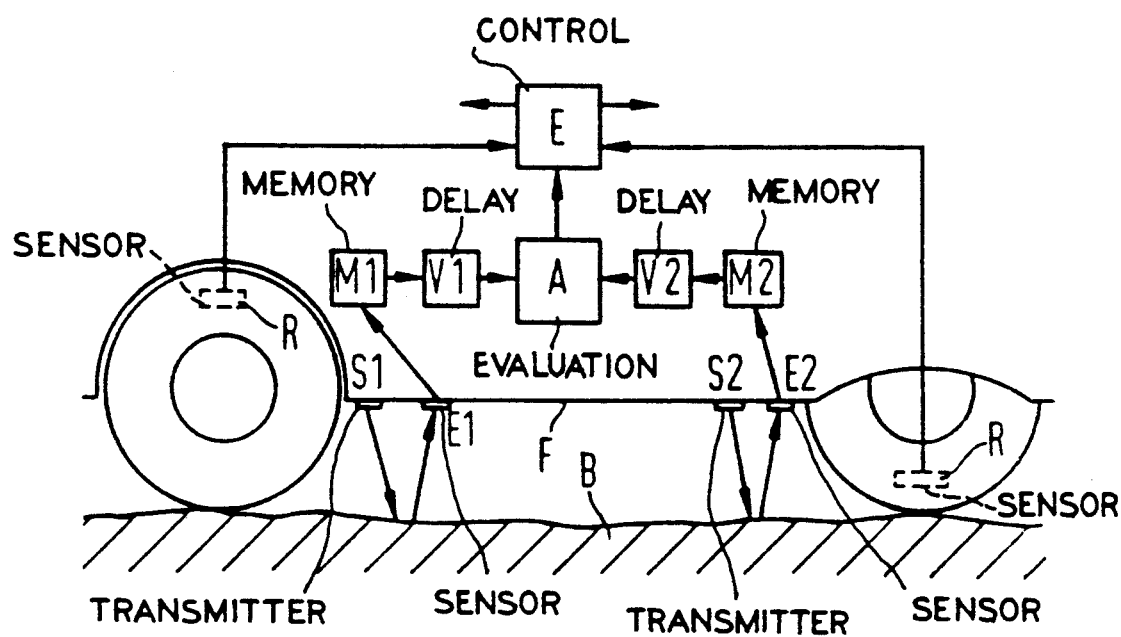

ARRANGEMENT OF ELECTRONIC PARTS FOR AN ANTI-LOCK BRAKING SYSTEM FOR A VEHICLE

BACKGROUND OF THE INVENTION

The invention relates to a circuit arrangement for an anti-locking braking system for motor vehicles.

A known circuit arrangement (FR-A 2,250,098) of such a type relates to an anti-lock braking system for motor vehicles. Inter alia, it has an image correlator in which beams emitted from a light source are thrown onto the road and the reflected beams pass via a diffraction grating to two photo-electric receivers. When the vehicle is moving, the output signals of these receivers have a frequency component which is evaluated. At a vehicle speed which would lead to locking of the wheels and hence to the vehicle skidding in the event of sudden braking, the evaluation leads to the brakes of the vehicle being operated automatically and, in addition, to a suitable warning advice for the driver optionally being activated.

In contrast, normal anti-lock braking systems identify the start of the locking of a wheel in that the rotation speeds of the various wheels differ from one another in a typical manner. However, a difficulty with such a circuit arrangement is that it must also be able to identify that all the wheels are locked simultaneously when the vehicle is not yet stationary, that is to say when it is skidding over the ground beneath it with the wheels locked.

SUMMARY OF THE INVENTION

It is an object of the present invention to provide an improved anti-locking system for a vehicle that automatically senses the vehicle skidding when all wheels of the vehicle are locked.

This object is achieved by a circuit arrangement for an anti-lock braking system for motor vehicles, which has:

electronic wheel sensors which monitor the rotation of the wheels of the motor vehicle during braking;

a control unit which evaluates the signals from the wheel sensors an which acts on the wheels to prevent locking of the wheels;

a clearance sensor, which is fitted close to or on the vehicle floor and is directed toward the road surface, and which has a radiation transmitter and a radiation receiver;

a memory unit which briefly stores the signals received from the clearance sensor;

an evaluation unit, by means of which the stored signals of the clearance sensor are checked for changes which indicate a movement of the vehicle;

a second clearance sensor located close to or on the vehicle floor, and directed toward the road surface, such that it receives the signals reflected from the road surface at the point at which the first clearance sensor has previously received the reflected signals for a straight-ahead movement of the motor vehicle;

at least one adjustable delay unit connected to the evaluation unit, and the signal which is received from the first clearance sensor and stored being compared by the evaluation unit, after the adjusted delay time, with the signal received from the second clearance sensor, and, if the compared signals correspond, a control signal being transmitted to the control unit, which signal indicates that the motor vehicle is skidding.

Advantageous developments of the present invention are as follows. The clearance sensor has at least one ultrasound transmitter which ensonifies the road surface at a constant frequency. This makes it possible, at a particularly low cost, to estimate the speed at which the vehicle is skidding when its wheels are locked.

At least the evaluation unit and the memory unit are contained in a computer. This makes it possible to estimate, at low cost, considerably more accurately the speed at which the vehicle is skidding in a direction in which the two ground clearance sensors are arranged one behind the other on the vehicle floor.

The ground clearance sensor/the ground clearance sensors are sensors which receive ultrasound. This makes it possible to produce and the operate the arrangement at a particularly low cost.

At least a single ultrasound transmitter which ensonifies the road is/are fitted close to the ultrasound sensor/sensors. This makes it possible to use ultrasound sources which can be operated particularly reliably as well as those ultrasound sensors which can be produced at particularly low cost and which themselves do not additionally (for example in accordance with the radar principle) emit ultrasound.

At least the evaluation apparatus and the memory unit/units are implemented using the hardware and software of a computer. This makes it possible to produce and operate the arrangement at a particularly low cost.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE is a diagram depicting the electronic components for an anti-lock braking system of a motor vehicle according to the present invention.

DESCRIPTION OF THE PREFERRED EMBODIMENT

The single FIGURE shows an example of the arrangement according to the invention of electronic parts for an anti-lock braking system of a motor vehicle. In a manner which is typical for most anti-lock braking systems, it contains electronic wheel sensors R which monitor the rotation behavior of the wheels and/or of the axles of the motor vehicle during braking. The control unit E, which is controlled electronically by the wheel sensors R, for its part acts differently in the case of locking on the wheels of the motor vehicle, to be precise depending on their locking state, such that these wheels are optimally braked without locking.

Normally, such arrangements identify the start of locking of a wheel in that the speeds of the different wheels differ from one another in a typical manner. As already mentioned, however, there is a difficulty in the case of such arrangements, inter alia, in that they are intended to identify automatically whether all the wheels are locked simultaneously, that is to say that the vehicle is not yet stationary but is still skidding.

The invention therefore uses the scanning of the ground structures and ground unevennesses with high accuracy by means of at least one—there are two in the example shown in the figure—ground clearance sensors in order to be able to deduce the skidding of the vehicle, when the wheels are stationary, from the fluctuating signal received by the ground clearance sensor. The invention thus uses the measurement of the very small—and possibly also the relatively large—ground unevennesses, that is to say the microstructure and/or the macrostructure of the ground surface under the motor vehicle, in order to identify whether the vehicle is already stationary or is still skidding.

The arrangement shown therefore contains—independently of the wheel sensors R which identify the wheel rotation behavior - two ground clearance sensors E1, E2 which are fitted one behind the other close to or on the vehicle floor F and whose directional characteristics are oriented toward the ground B such that the second ground clearance sensor E2 in general measures the ground clearance—primarily during straight-ahead skidding—where the first ground clearance sensor E1 has previously measured the ground clearance.

In the case of vehicles which already have one or more such ground clearance sensors E1, E2 for other reasons, the invention allows these ground clearance sensors also to be used for the invention. In the case of the invention, it is thus also possible to use ground clearance sensors E1, E2 when these are also used, per se, for electronically controlling the vehicle suspension and/or the damping.

The evaluation unit A can identify that the vehicle is still skidding just from the fluctuating changes in the amplitude and/or frequency of the individual signal which each individual ground clearance sensor E1, E2 inherently receives.

In principle, it is thus sufficient to use only a single ground clearance sensor E1 to identify the skidding when the wheels are locked. This use according to the invention even of only a single ground clearance sensor E1 already makes it possible to identify at least coarsely the speed at which the vehicle is skidding. For this purpose, to be specific, the bandwidth of the signal received by the ground clearance sensor can be evaluated taking into account the Doppler effect, or values which correlate with the bandwidth can be evaluated. It is thus possible, for example, also to measure the amplitude of the received signal at a second frequency, related to the amplitude at a defined mean first frequency within the received frequency spectrum. In this case, it is possible to take the Doppler effect into account particularly precisely if, in addition, at least a single ultrasound transmitter S1 and/or S2 is fitted which ensonifies the road B, that is to say the ground B, at a constant frequency, in order to detect by means of the evaluation unit A, at least coarsely, the frequency changes caused by the Doppler effect.

However, in order to increase the accuracy with which the skidding speed is measured, it is also possible to fit at least two ground clearance sensors E1, E2 behind one another close to or on the vehicle floor F and to orient their directional characteristics with respect to the ground B such that the second ground clearance sensor E2 in general measures the ground clearance, during skidding in the straight-ahead direction, where the first ground clearance sensor E1 has previously measured the ground clearance.

The received signals of the two ground clearance sensors E1, E2 are then additionally compared with one another in the evaluation unit A in order to identify whether the second ground clearance sensor E2—even if it is time delayed—is measuring the same ground unevennesses that the first ground clearance sensor E1 has previously measured. From the magnitude of the time delay of the measurement of the same structure in the first, and then in the second, ground clearance sensor, the evaluation unit obtains the absolute skidding speed of the motor vehicle at least approximately, in any case as long as the motor vehicle is skidding in the same direction (forwards or backwards), as that in which the relevant ground clearance sensors E1, E2 are fitted on the vehicle floor F. If, in this case, both ground clearance sensors E1, E2 measure fluctuating signals, that is to say changing ground unevennesses, without coincidence of the measured ground (micro) structures being able to be found by the evaluation unit A by delaying one of the received signals in time, then the motor vehicle is skidding to a greater or lesser extent laterally away instead of in that direction in which these sensors E1, E2 are mounted on the vehicle floor F. Whether and to what extent the ground unevennesses measured by the two ground clearance sensors E1, E2 are or are not identical to one another is thus identified by the evaluation unit A.

The example shown in the figure allows the skidding speed of the vehicle to be measured particularly accurately in general. The ground unevennesses measured simultaneously by the two ground clearance sensors E1, E2 are, specifically, de facto never identical if only the measurement accuracy is large enough for identifying the ground structure by means of the ground clearance sensors. Specifically, the time delay, caused by the skidding speed, between the received signals must still be considered.

The invention therefore additionally has at least one memory unit—the two memory units M1 and M2 in the example shown—as well as the delay adjusting units V1, V2 whose delay can be controlled, for example, by the evaluation unit A. These memory units M1, M2 can also have a common housing together with the evaluation unit A—also together with the delay adjusting units V1, V2 and also together with the associated ground clearance sensors E1, E2; thus these memory units M1, M2 can therefore also be fitted, for example, within the evaluation unit A.

These memory units M1, M2 represent, for example, at least circuit parts, for example an RC element, which allow at least the rise or fall in the amplitude and/or frequency of the received signals to be identified. These memory units M1, M2 can, however, also represent, for example, a RAM memory or a memory like a shift register, which in each case briefly store the signal received in each case from the associated ground clearance sensor E1 or E2, that is to say the signal in each case received from the first ground clearance sensor E1 or from the second ground clearance sensor E2 respectively, in each case briefly, for example for a few seconds or for fractions of a second.

In addition, the example shown contains delay adjusting units V1 and V2 which are allocated to the two memory units Mi and M2. These delay adjusting units V1, V2 allow the signal sequences which are stored in the memory units M1 and M2 to be compared in the evaluation unit A with an adjustable, variable delay. For example, these delay adjusting units V1 and V2 can also be implemented by means of software if the evaluation unit A is essentially formed by a computer A which also contains the memory units M1, M2. The evaluation unit A thus does not compare directly the signals received from the ground clearance sensors E1, E2 but signals of which at least one can be delayed for a short time which is furthermore variable.

If the evaluation unit is able to determine by means of the delay adjusting units V1, V2 a specific delay for the delay adjusting unit V1 or V2 at which there is a large amount of identity of the signals received successively in time from the ground clearance sensors E1, E2, then this is a criterion for the fact that the vehicle is skidding in the straight-ahead direction—formulated even more precisely, that it is skidding in that direction in which the two ground clearance sensors E1, E2 are mounted one behind the other on the vehicle floor F. In addition, the evaluation unit A uses the magnitude of the adjusted delay to identify how quickly the vehicle is skidding at the time. In this case, the invention thus allows even a rather precise absolute measurement of the skidding speed when the wheels are locked.

In order to be able to identify automatically that the vehicle is still skidding when all the wheels are locked, the evaluation unit A in this example thus compares the signal received from the first ground clearance sensor E1 with that from the second ground clearance sensor E2, preferably by means of a delay adjusting unit Vi or V2 respectively, and by means of a memory unit M1 or M2 respectively, in order to identify the time shift of the received signals corresponding to the vehicle speed.

However, because the vehicle can skid both in the forwards direction and in the rearwards direction, in the example shown, each of the two ground clearance sensors E1, E2 has allocated to it a dedicated memory unit M1, M2 and a dedicated delay adjusting unit V1, V2.

It is possible to produce and operate the arrangement at a particularly low cost if sensors which receive ultrasound are used as the ground clearance sensors E1, E2.

The vehicle itself, for example its engine, frequently already produces sufficiently powerful ultrasound which is reflected by the ground B and is thereafter received by the two ground clearance sensors E1, E2. However, even in the absence of ultrasound engine noises or vehicle noises, it is possible to use the ultrasound sensors E1, E2, which can be produced at particularly low cost,—even when these ultrasound sensors E1, E2 themselves do not additionally emit ultrasound, for example in accordance with the radar principle. Specifically, likewise at a very low cost, at least a single ultrasound transmitter S1, S2 which ensonifies the road can additionally be fitted on or close to the vehicle floor F - preferably close to the ultrasound sensors E1, E2 - such that its directional emission characteristic is (in each case) directed toward the ground B. It is particularly favorable to fit two ultrasound transmitters S1, S2 and to align their directional emission characteristics toward the ground B such that, in the normal case, that is to say with flat ground B, as much sound energy as possible is radiated into the associated ground clearance sensors E1, E2.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for an anti-lock braking system for a motor vehicle, comprising:
   electronic wheel sensors which monitor rotation behavior of wheels of the motor vehicle during braking;
   a control unit which evaluates signals from the wheel sensors and which acts on the wheels to prevent locking thereof;
   a first clearance sensor, which is fitted close to or on a vehicle floor of the motor vehicle and which is directed toward a road surface, and which has a radiation transmitter and a radiation receiver;
   a memory unit which briefly stores sensor signals received from the first clearance sensor;
   an evaluation unit, by means of which the stored sensor signals of the first clearance sensor are checked for changes which indicate a movement of the motor vehicle;
   a second clearance sensor fitted close to or on the vehicle floor, and directed toward the road surface, such that the second clearance sensor receives radiation signals reflected from the road surface at a point at which the first clearance sensor has previously received the reflected radiation signals for a straight-ahead movement of the motor vehicle;
   at least one adjustable delay unit connected to the evaluation unit;
   the sensor signal, which is received from the first clearance sensor and stored, being compared by the evaluation unit, after an adjusted delay time, with a sensor signal received from the second clearance sensor, and, if the compared sensor signals correspond, a control signal being transmitted to the control unit, which control signal indicates that the motor vehicle is skidding.

2. The circuit arrangement as claimed in claim 1, wherein the second clearance sensor has at least one ultrasound transmitter which ensonifies the road surface at a constant frequency.

3. The circuit arrangement as claimed in claim 1, wherein at least the evaluation unit and the memory unit are contained in a computer.

4. The circuit arrangement as claimed in claim 1, wherein the first and second clearance sensors are sensors which receive ultrasound.

5. The circuit arrangement as claimed in claim 4, wherein at least one ultrasound transmitter which ensonifies the road is fitted close to at least one of the ultrasound sensors.

6. The circuit arrangement as claimed in claim 1, wherein at least the evaluation unit and the memory unit are implemented using hardware and software of a computer.

* * * * *